May 16, 1933. B. B. FORBES 1,908,836
CULTIVATOR
Filed March 26, 1931
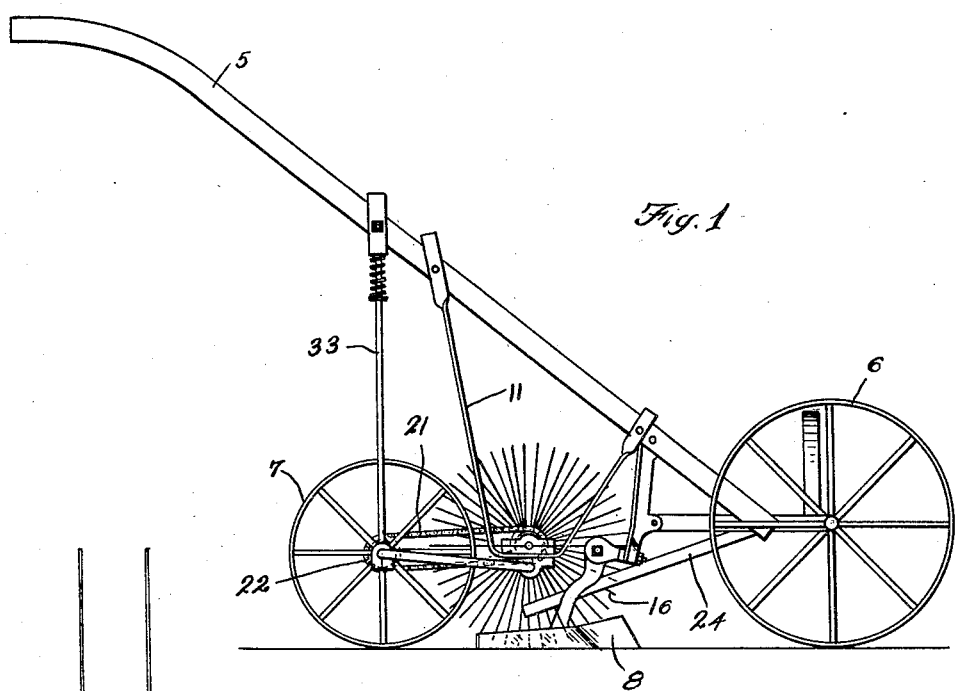
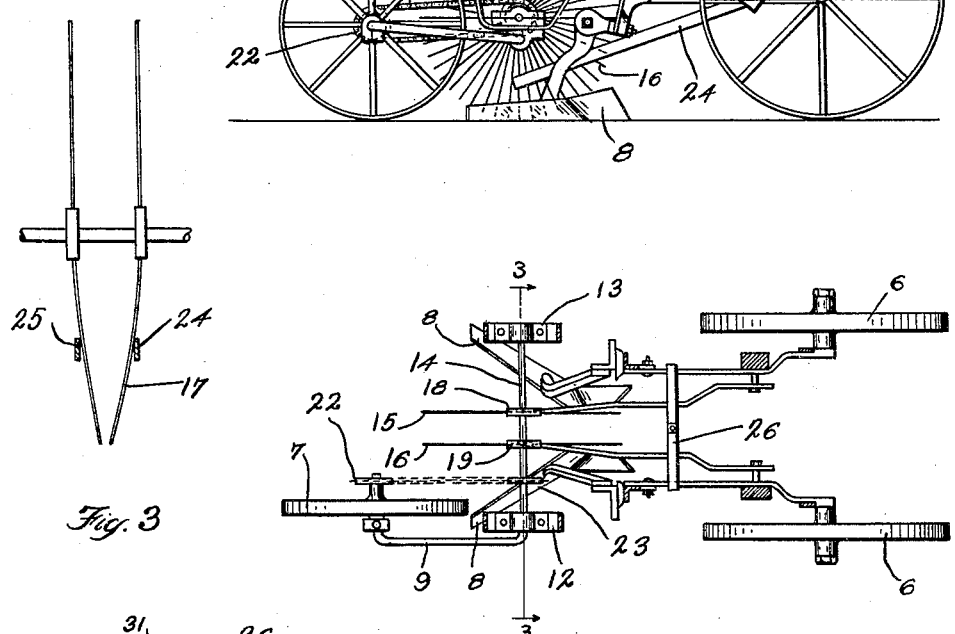
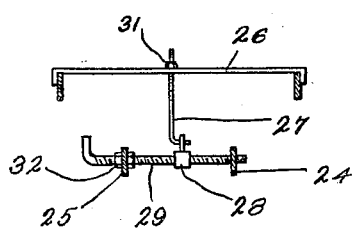
INVENTOR.
Bert B. Forbes
BY
Fay Oberlin & Fay
ATTORNEYS.

Patented May 16, 1933

1,908,836

UNITED STATES PATENT OFFICE

BERT B. FORBES, OF BIG PRAIRIE, OHIO, ASSIGNOR OF ONE-HALF TO DALLAS LITTERAL, OF SHREVE, OHIO

CULTIVATOR

Application filed March 26, 1931. Serial No. 525,381.

This invention relates to agricultural machines or implements of the nature of cultivators and, more particularly, to implements which will cultivate the soil close to a row of plants without injuring these or, in some cases, cultivation can be carried on in the row itself leaving no unworked soil.

Cultivators at present in use for the purpose of loosening the soil and killing weeds between rows of growing crops cannot be operated very close to the row without injuring young plants. As a consequence, a strip of weed-infested soil is left around the plants which must be broken up by hand, with a hoe, or weeded manually. Either of these operation is costly, slow, and laborious, and an instrument which would permit this uncultivated strip of soil to be cut to a minimum width or entirely done away with would effect a great saving of time and money.

It is, accordingly, an object of the present invention to provide an agricultural implement which will cultivate soil between rows of crops so as to leave little or no uncultivated soil. Another object of my invention is to provide an implement constructed to cultivate crops close to or in the row without injuring the plants. Still another object of my invention is to provide an implement for cultivating crops easily, quickly, and inexpensively. A further object of my invention is to provide a method of cultivating between plant rows which permits close or complete cultivation without injury to the plants. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a side elevation of the new agricultural implement; Fig. 2 is a top plan view of the implement shown in Fig. 1; Fig. 3 is an end view showing two of the soil-working elements found in my implement; and Fig. 4 is a detail of the adjusting means for regulating the cultivator elements.

Referring to Fig. 1 of the drawing, the implement consists of a structure which may, in general, follow the outline of the ordinary cultivator as now used and of which the main features are operating handles 5, front wheels 6 and rear wheel 7, together with cultivator blades 8. These blades cultivate the soil between the rows in the ordinary manner leaving a strip of uncultivated soil on either side of the row since the blades cannot be brought too near the plants without injuring them. The present invention concerns means for cultivating the strip of unworked soil lying between the cultivator blades 8. On the rear wheel 7 is mounted a bent rod 9 and this together with a rod or rods 11 depending from the handle 5 supports the bearings 12 and 13 in which is mounted the transverse shaft 14. On this shaft rotate two vertically mounted discs 15 and 16, each of which is composed of many wire rods 17 inserted in the hubs 18 and 19. The wire rods are made from resilient stock. The discs, composed of these wire rods, are caused to revolve by means of the chain 21 which runs over the sprockets 22 and 23, thus transmitting the motion of the rear wheel 7 to the discs.

The individual wire rods are caused to bend in or converge toward one another by the bars or cam plates 24 and 25 which are mounted on the frame work of the cultivator and extend downwardly toward the rear of the implement, at the same time converging toward one another so as to press the wire rods 17 inwardly as the disc approaches the soil under cultivation.

Regulating means are provided whereby the cultivating elements may be adjusted for the particular work in hand. Referring to Figs. 2 and 4, a cross piece 26 is mounted on the framework of the cultivator and is pierced at its midpoint by a threaded hook 27 which, in turn, engages with a coupling 28. This coupling is threaded and engages the threaded rod 29. By turning the nut 31 located on the hook 27, the rod 29 may be raised or lowered, thus bringing the cam plates 24 and 25, which are engaged by the threaded rod 29, away from or toward the soil. The rod 29 may also be used to adjust the space between the cam plates 24 and 25 in a lateral direction by turning the nut 32.

Since the shaft 14 is mounted on the rear wheel 7 of the cultivator, the depth to which the rods 17 penetrate the soil may be regulated by adjusting the vertical shaft 33 attached to the handle 5, the rods 11 being also adjustable.

In operation, the cultivator is pushed along a row by means of the handle 5 or a horse may be attached, or other traction power used as in the case of the ordinary cultivator. The cultivator straddles the row and the blades 8 cultivate the soil at some distance away from the plants in the well known manner. The discs 15 and 16 enter the soil on either side of the row as close to the growing plants as is desired, or even directly in the rows, the discs revolving by means of the motion transmitted through the chain 21 from the rear wheel 7. As each rod in the two discs approaches the bar or cam plate 24, it is gradually forced inward toward the row until it reaches its lowest position, at which time it has entered the soil to the desired depth. At this point in its travel the rod passes beyond the end of the plate 24 and is suddenly released, its natural resilience causing it to spring suddenly outward and to break up the soil by its motion. Each wire rod in turn is thus forced inwardly closely adjacent the row of plants or into the row, the rods in the opposite disc being likewise forced in and, between them, leaving a space which may closely approach the minimum width occupied by the plants themselves or the discs may be adjusted to leave no uncultivated soil whatever. The disc moves forward as an integral part of the cultivator and each rod again approaches the soil to repeat its operation as the operator proceeds down the row. The effect is that of a constant succession of kicking motions which thoroughly break up the soil between the plants and the area cultivated by the blades 8.

Since the motion of the rods is away from the plants, there is no danger of injuring these and it is only necessary to make the required adjustment for each kind of crop, whereafter the rods can approach no closer to the plants. In the case of some crops, there may be a zero adjustment, the rods operating between the plants.

The various adjustments may be made by the mechanism shown in Fig. 4 as, for instance, raising the cam plates 24 and 25 so as to allow a larger space between the peripheries of the discs 15 and 16 or lowering these plates where a narrower space may be maintained. Lateral adjustment of the individual cam plates in relation to one another may also be secured by means of the threaded rod 29 and nut 32. The depth to which the soil is cultivated in proximity to the plants is determined, of course, by the depth to which the rods 17 penetrate the soil and this may be adjusted by raising or lowering the rod 33 and the wheel 7 attached thereto.

My new agricultural implement is the only machine of its kind, so far as I am aware, which can be used to cutivate crops planted in rows as close as may be desired without injuring the crop plants. The fine wire rods do not disturb the soil sufficiently to injure the roots and, due to the peculiar manner in which they operate; namely, by kicking away from the row, there is no possibility of the machinery coming closer to the rows than the original adjustment permits. In many cases, the crop may be cultivated directly in the rows, the fine rods breaking up the surface of the soil without injuring the plants. The use of this implement does away with the necessity for much hand labor such as hoeing and weeding which has been heretofore necessary in the raising of crops, particularly of onions, and the like. The implement is simple in construction and operation and there are no delicate parts to get out of order or to suffer deterioration through hard use and weathering.

Other modes of applying the principle of my invention may be employed instead of the one explained, change being made as regards the mechanism herein displosed, provided the means stated by any of the following claims or the equivalent of such stated means be employed.

I therefore particularly point out and distinctly claim as my invention:

1. A cultivator comprising two revoluble discs composed of radially mounted resilient rods, converging cam plates adapted to force said rods toward a row of plants from either side as the rods approach the soil and adapted to permit said resilient rods to spring away from said row of plants while inserted in the soil.

2. A cultivator comprising two revoluble discs composed of radially mounted resilient rods, converging cam plates adapted to force said rods into a row of plants from either side as the rods approach the soil and adapted to permit said resilient rods to spring away from said row of plants while inserted in the soil.

3. In a cultivating apparatus, the combination with a frame adapted for movement over the ground along the line to be cultivated, of a plurality of resilient rods supported on said frame, means for progressively forcing said rods into the ground as said frame moves thereover, and means disposed in the path of normal movement of said rods and engageable therewith to force the same toward the line being cultivated before and while said rods enter the ground while permitting said rods to spring back to their normal position after they have entered the ground.

4. An agricultural implement comprising a frame adapted to be moved horizontally, a plurality of resilient rods supported at one end by said frame and movable therewith, means for progressively moving the opposite ends of said rods downwardly as the frame moves horizontally, means disposed in the normal path of said rods and engageable therewith to force the same laterally out of said normal path, said means being positioned so as to release said rods when the free ends of the latter are in their lowermost position, and means for again raising said rods.

5. An agricultural implement comprising a frame adapted to be moved over the ground along a row to be cultivated, a plurality of resilient rods supported on said frame, means for forcing said rods progressively into the ground as said frame moves thereover, and means disposed in the path of normal movement of said rods and engageable with said rods to force the same toward said row as the individual rods approach the ground and positioned so as to release said rods while in the ground.

6. In a cultivating apparatus, the combination with a frame adapted for movement over the ground along a line to be cultivated, of a plurality of resilient rods supported on said frame, means for progressively forcing said rods into the soil as said frame moves thereover, and means disposed in the path of normal movement of said rods and engageable therewith to force the same toward the line being cultivated before and while said rods enter the soil and positioned so as to release said rods for resilient return through the soil to normal position.

7. An agricultural implement comprising a frame, a pair of blades mounted on said frame in spaced relation, a series of resilient rods supported at one end by said frame and positioned between said blades, means for moving said rods longitudinally between said blades, and means on said frame for moving the free end of each rod intermittently laterally to its path of longitudinal travel during such travel.

8. An agricultural implement comprising a frame, a pair of blades mounted on said frame in spaced relation, a series of resilient rods supported in alignment by said frame and positioned between said blades, means for moving said rods bodily in the plane of alignment and means on said frame for intermittently forcing the free extremities of said rods individually out of alignment during a portion of their travel.

9. In a cultivating apparatus, the combination with a frame adapted for movement over the ground along a line to be cultivated, of a rotatable disc vertically mounted on said frame and carrying a plurality of radially disposed resilient rods engageable with the soil adjacent the line to be cultivated, means for rotating said disc and bringing the extremities of said rods progressively into the soil, means disposed in the path of said rods and engageable therewith to force said rods inwardly toward the line being cultivated and positioned to release said rods while in the soil.

Signed by me this 13th day of March, 1931.

BERT B. FORBES.